United States Patent [19]
Ishigaki

[11] Patent Number: 5,891,492
[45] Date of Patent: Apr. 6, 1999

[54] FERMENTED SESAME HAVING ANTIOXIDATIVE PROPERTIES, AND FOOD CONTAINING THE SAME

[75] Inventor: Reisaburo Ishigaki, Shizuoka, Japan

[73] Assignee: Yugengaisha SOI, Shizuoka, Japan

[21] Appl. No.: 972,730

[22] Filed: Nov. 18, 1997

[30] Foreign Application Priority Data

Jul. 4, 1997 [JP] Japan ..................................... 9-179509

[51] Int. Cl.⁶ ................................. A23G 1/02; A23L 1/20
[52] U.S. Cl. ................................. 426/44; 426/46; 426/52; 426/549; 426/583; 426/598; 426/629
[58] Field of Search .................................. 426/44, 46, 52, 426/598, 629, 549, 583; 435/252.2, 252.9, 272

[56] References Cited

U.S. PATENT DOCUMENTS 3,885,048  5/1975  Liggett ..................................... 426/18
5,498,412  3/1996  Fujie ..................................... 424/195.1

FOREIGN PATENT DOCUMENTS 90-146879  6/1990  Japan .

*Primary Examiner*—Nina Bhat
*Attorney, Agent, or Firm*—Young & Thompson

[57] ABSTRACT

A fermentation product of sesame with antioxidative properties is provided. This product is useful for use as a food. The fermented sesame is produced by digesting crushed raw whole seed sesame with an enzyme derived from *Rhizopus oligosporus*, followed by lactic acid fermentation.

8 Claims, No Drawings

FERMENTED SESAME HAVING ANTIOXIDATIVE PROPERTIES, AND FOOD CONTAINING THE SAME

BACKGROUND OF THE INVENTION

This invention relates to a fermentation product of sesame seeds and functional foods utilizing antioxidative properties of the sesame fermentation product.

Sesame is a traditional plant whose seeds have been used as a spice and as a source of oil. Recently, sesame is attracting attention of food-faddists for its excellency as a source of essential fatty acids such as linolic acid and essential amino acids such as methionine.

In spite of such merits as a food, it has been rather difficult to process the sesame seeds into a food which can be easily eaten, and in particular, fermentation of the sesame seeds into a digestible food product has been quite difficult due to the lower content of pentose and hexiose in comparison with the higher content of proteins. So far, there is no known fermentation product of the sesame seeds.

SUMMARY OF THE INVENTION

In view of the above-described situation, an object of the present invention is to provide a digestible and absorbable fermentation product of sesame seeds. Another object of the present invention is to provide a useful functional food wherein antioxidative properties of such sesame fermentation product is utilized.

Such objects of the present invention are attained by the (1) to (9) as described below.

(1) A fermentation product of sesame seeds having antioxidative properties prepared by digesting powder of raw whole seed sesame with an enzyme derived from *Rhizopus oliygosporus*; and subjecting the digestion product to lactic acid fermentation.

(2) A dietary food comprising granules of said fermented sesame of (1).

(3) A food containing the fermented sesame of (1).

(4) A cookie containing the fermented sesame of (1).

(5) A bread containing the fermented sesame of (1).

(6) A soup containing the fermented sesame of (1).

(7) A yogurt containing the fermented sesame of (1).

(8) A food composition containing the fermented sesame of (1) and lactic acid-fermented soy bean.

(9) A food composition containing the fermented sesame of (1) and at least one member selected from soy bean fermentation products (A) and (B):

wherein fermented soy bean (A) is the one produced by
(i) steaming powder of hull-removed soy bean and enzymatically digesting the steamed soy bean with an enzyme derived from *Aspergillus orizae*;
(ii) inoculating *Lactobacillus bulgaricus* and *Streptococcus thermophilus* to the digestion product of (i) and incubating the culture; and
(iii) inoculating *Propionibacterium shermanii* to the lactic acid fermentation product of (ii) and incubating the culture; and fermented soy bean (B) is the one produced by
(i) steaming powder of hull-removed soy bean and enzymatically digesting the steamed soy bean;
(ii) inoculating *Lactobacillus bulgaricus* and *Streptococcus thermophilus* to the digestion product of (i) and incubating the culture; and
(iii) inoculating yeast to the lactic acid fermentation product of (ii) and incubating the culture.

DETAILED DESCRIPTION OF THE INVENTION

First aspect of the present invention is a fermentation product of sesame seeds having antioxidative properties prepared by digesting crushed law whole seed sesame with an enzyme derived from *Rhizopus oligosporus*, and subjecting the digestion product to lactic acid fermentation.

The raw whole seed sesame is liquidified by crushing the sesame seed with optional addition of water, and the liquidified sesame is preferably sterilized. An enzyme derived from *Rhizopus oligosporus* is added to the liquidified sesame, and the mixture is agitated preferably under the conditions of 95° C. for 60 minutes 121° C. (at 1 kg/cm$^2$) for 5 minutes to destroy the tissue. The resulting mixture is then fermented with a lactic acid bacterium. Lactic acid bacteria is a general name given to gram- positive bacteria which assimilate sugar and whose final metabolite contains more than 50% by molecule number of lactic acid. Lactic acid bacteria are currently divided into five groups, namely, Streptococcus, Pediococcus, Leuconostoc, Lactobacillus and Bificofacterium. The lactic acid bacterium employed in the present invention is not limited to any particular species. It is, however, preferable to use a mixture of two lactic acid bacteria, namely, *Lactobacillus bulgaricus* in combination with *Streptococcus thermophilus*.

The lactic acid bacteria are inoculated to the digested sesame preferably after heat sterilization of the digested sesame having optionally added thereto a nutrition source as described below. The heat sterilization is preferably effected at 95° C. for 60 minutes to 121° C. for 5 minutes.

When the liquidified sesame produced by wet crushing is digested and fermented using an enzyme such as a proteolytic enzyme, the amino acids generated such as isoleucine confer bitter taste to the resulting product, rendering the product unsuitable for eating.

On the other hand, when the liquidified sesame produced by wet crushing is digested with a crude enzyme such as an enzyme derived from Rhyzopus orygosporus which will be involved only in the destruction of the tissue, and the digested sesame is lactic acid-fermented to a pH of about 4.0, the liquidified sesame will be converted into an edible yogurt-like food product of nice taste and flavor which is quite pleasant to the palate.

When a lactic acid bacterium is directly added to the mixture of law sesame and water that has been crushed and sterilized, time required for propagation of the bacterium would be enormous. When up to 20% by weight in total weight of carrot which is sufficiently rich in sugar and nutrients for active growth of the lactic acid bacteria or up to 2% by weight in total weight of yeast extract which is assumed to be effective for bacterial growth is added to the liquidified sesame, pH after 24 hours cultivation will be about 4.1, which is a level well acceptable for industrial fermentation process.

Examples of the nutrition sources that may be added for the lactic acid fermentation include malt extract and cone steep liquor in addition to the above-mentioned carrot and yeast extract.

The resulting fermented liquor may be consumed as it is, namely, as a yogurt-like beverage with no further processing. However, if the fermentation liquor is concentrated and dried into granular or powder product, such product will have improved storage and transportation feasibility, and such product can also be added to various other foods to produce functional foods.

The fermented sesame of the present invention may be utilized as a food containing sasamenol which has antioxidative function, and the fermented sesame is expected to protect the body of the intaker from suffering from various dysfunctions caused by oxidation and prevent various diseases considered to be caused by oxidation stress, for example, cancer, arterial sclerosis, diabetes and their complications, and ishemic cardiac diseases.

The foods containing the antioxidative fermented sesame of the present invention are advantageous as functional foods since they are antioxidative, and exemplary such foods are as described below.

(1) Yogurt containing the fermented sesame

The fermented sesame of the present invention is itself a food with a yogurt flavor. When the fermented sesame is mixed with a conventional yogurt made from cow milk or soy bean milk, the resulting yogurt would be an antioxidative functional food.

(2) Dietary food comprising granular product of the fermented sesame

The fermented sesame of the present invention may be processed into granules, for example, drying treatment such as by spray drying. The granules themselves may be used for a dietary food to utilize the antioxidative properties of the fermented sesame. The granule form fermented sesame is provided with excellent storage life and prosessibility, and therefore, it is quite convenient to use the granule form fermented sesame for addition to other foods.

(3) Soup and soup stock containing the fermented sesame

Addition of the fermented sesame of the present invention to a soup will result in an improved flavor of the soup, and it is an effective use of the antioxidative properties of the fermented sesame. The fermented sesame of the present invention may also be added to a conventional soup stock, soup, or pottage.

(4) Cookies or rice crackers containing the fermented sesame

The fermented sesame of the present invention may be mixed with wheat flour or glutinous rice and made into cookie or rice cracker. The resulting cookies or the rice crackers will be functional foods with antioxidative properties having nice sesame flavor. The sesame flavor may be enhanced by sprinkling sesame seeds on the surfaces of the cookies or the rice crackers.

(5) Bread containing the fermented sesame

The fermented sesame of the present invention may be mixed with wheat flour and baked into a bread. The resulting bread is provided with antioxidative properties.

The fermented sesame of the present invention may be used in combination with lactic acid fermented soy bean, soy bean fermentation product (A), soy beam fermentation product (B), or both in a food composition. Both (A) and (B) are described below. The food composition containing the lactic acid fermented soy bean and/or soy bean fermentation products will then have a nice flavor as well as a surprisingly prolonged storage life owing to the antioxidative action of the fermented sesame. For example, it is usually difficult to store a typical dried lactic acid fermented soy bean for one month, and the addition of the fermented sesame will prolong the storage life to one year or so. The fermented soy bean products (A) and (B) are described in detail in JP-B-08-00043.

<Lactic acid fermented soy bean>

The lactic acid fermented soy bean product used in the present invention is not limited to any particular types, and may be prepared by any of the known methods.

Preferably, a mixture of crushed hull-removed soy bean and crushed sesame seeds is enzymatically digested with an enzyme derived from *Aspergillus orizae* and/or *Rhizopus Oligosporus*, and subsequently, subjected to lactic acid fermentation with *Lactobacillus bulgaricus* and *Streptococcus thermophilus* to produce lactic acid fermented product.

<Fermented soy bean (A)>

The fermented soy bean (A) is produced by (i) steaming powder of hull-removed soy bean and enzymatically digesting the steamed soy bean;

(ii) inoculating *Lactobacillus bulgaricus* and *Streptococcus thermophilus* to the digestion product of (i) and incubating the culture; and (iii) inoculating *Propionibacterium shermanii* to the lactic acid fermentation product of (ii) and incubating the culture.

<Fermented soy bean (B)>

The fermented soy bean (B) is produced by (i) steaming powder of hull-removed soy bean and enzymatically digesting the steamed soy bean with an enzyme derived from *Aspergillus orizae*;

(ii) inoculating *Lactobacillus bulgaricus* and *Streptococcus thermophilus* to the digestion product of (i) and incubating the culture; and (iii) inoculating yeast to the lactic acid fermentation product of (ii) and incubating the culture.

In the case of the fermented soy bean which has gone through the propionic acid fermentation before the commencement of propionic acid fermentation, the fine powder of hull-removed soy bean which constitutes the culture has been digested with an enzyme derived from *Aspergillus orizae* and the thus digested soy bean has been fermented in the copresence of *Lactobacillus bulgaricus* and *Streptococcus thermophilus*. [In the case of (B), yeast is further inoculated in addition to the above-mentioned two lactic acid bacteria.] Therefore, in case of (A), the fermentation product contains complicated nitrogen compounds, pantoten acid, biotin and other vitamins which are necessary for the growth of propionic acid bacterium in the subsequent propionic acid fermentation. A stable propionic acid fermentation is thereby realized.

When the propionic acid fermentation is effected in the presence of a small amount of yeast extract, molar ratio of propionic acid to acetic acid is stabilized to 2:1. The copresence of the two types of lactic acid bacteria with the propionic acid bacterium also results in an increased production of volatile acids, and the substrate consumed, namely, the lactic acid undergoes parallel fermentation. As a result, about 75% of said lactic acid is processed into propionic acid and acetic acid, leading to an improved yield.

The fermented sesame and the fermented soy bean are both lactic acid fermentation products, and therefore, relish and flavor are in good match with each other and the mixture has new taste. The fermented sesame is also highly antioxidative, and the mixture is an antioxidative functional food with anti-mold properties and long storage life.

The mixing ratio of the fermented sesame and the fermented soy bean is not limited to any particular ratio. The fermented sesame, however, may constitute from 1 to 20% by weight, and more preferably from 1 to 10% by weight of the total product. Inclusion of the fermented sesame of such content results in sufficiently antioxidative product with high storageability. The fermented sesame and the fermented soy bean may be produced separately from each other before mixing with each other, or alternatively, the sesame and the soy bean may be simultaneously subjected to the lactic acid fermentation in the same batch.

As in the case of the fermented sesame, the food composition containing the fermented sesame and the fermented soy bean of the present invention may be consumed with no further processing, or after being made into granular form. Furthermore, as in the cases of the yogurt, dietary food, soup, cookies and crackers, and bread of the above (1) to (5), the food composition containing the fermented sesame and the fermented soy bean of the present invention may be used to constitute a functional food.

Next, the present invention is described in further detail by refering to examples which by no means limit the scope of the present invention. The term, parts designates parts by weight unless otherwise noted.

EXAMPLES

Example 1

100 parts of finely crushed raw sesame seeds and 400 parts of hot water were mixed, sterilized, and cooled. To this mixture at 38° C. was added 0.05 parts of a crude enzyme derived from *Rhizopus oliygosporus* to digest the crushed sesame seeds and decompose the tissue structure. To the digested sesame mixture at 37° C. were inoculated two types of lactic acid bacteria, namely, *Lactobacillus bulgaricus* and *Streptococcus thermophilus*, and the mixture was incubated for 5 hours. The temperature was then reduced to 5° C., and the incubation at this temperature was continued. The pH of the mixture was 6.0 after 24 hours, 5.8 after 48 hours, and 4.3 after 72 hours. After the completion of the fermentation, the mixture was used as the product after optional drying.

Example 2

98 parts of finely crushed raw sesame seeds, 400 parts of hot water, and 2 parts of yeast powder were mixed, sterilized, and cooled. To this mixture at 38° C. was added 0.05 parts of a crude enzyme derived from *Rhizopus oligosporus* to digest the crushed sesame seeds and decompose the tissue structure. To the digested sesame mixture at 37° C. were inoculated two types of lactic acid bacteria, namely, *Lactobacillus bulgaricus* and *Streptococcus thermophilus*, and the mixture was incubated for 5 hours. The temperature was then reduced to 5° C., and the incubation at this temperature was continued. The mixture exhibited a pH of 5.5 after 24 hours, and 4.1 after 48 hours. After the completion of the fermentation, the mixture was used as the product after optional drying.

Example 3

98 parts of finely crushed raw sesame seeds, 400 parts of hot water, and 2 parts of carrot extract (concentrated to ⅕) were mixed, sterilized, and cooled. To this mixture at 38° C. was added 0.05 parts of a crude enzyme derived from *Rhizopus olirygosporus* to digest the crushed sesame seeds and decompose the tissue structure. To the digested sesame mixture at 37° C. were inoculated two types of lactic acid bacteria, namely, *Lactobacillus bulgaricus* and *Streptococcus thermophilus*, and the mixture was incubated for 5 hours. The temperature was then reduced to 5° C., and the incubation at this temperature was continued. The mixture exhibited a pH of 5.7 after 24 hours, and 4.0 after 48 hours. After the completion of the fermentation, the mixture was used as the product after optional drying.

The resulting fermented sesame was analyzed at Japan Food Analysis Center (a foundation), and the results are shown below.

| Items analyzed | Results | Method of analysis |
| --- | --- | --- |
| lipid | 53.2 g/100 g | ether extraction |
| monoglyceride | 0.36% | gas chromatography |
| diglyceride | 3.8% | gas chromatography |
| glycerin | 3.2% | gas chromatography |

Example 4

96 parts of finely crushed raw sesame seeds, 2 part of yeast powder, 400 parts of hot water, and 2 parts of carrot extract (concentrated to ⅕) were mixed, sterilized, and cooled. To this mixture at 38° C. was added 0.05 parts of a crude enzyme derived from *Rhizopus oligosporus* to digest the crushed sesame seeds and decompose the tissue structure. To the digested sesame mixture at 37° C. were inoculated two types of lactic acid bacteria, namely, *Lactobacillus bulgaricus* and *Streptococcus thermophilus*, and the mixture was incubated for 5 hours. The temperature was then reduced to 5° C., and the incubation at this temperature was continued. The mixture exhibited a pH of 4.0 after 24 hours. After the completion of the fermentation, the mixture was used as the product after optional drying.

Example 5

Fermentation of sesame and soy bean 90 parts of raw soy bean powder, 10 parts of raw sesame powder, and 400 parts of hot water were mixed, sterilized, and cooled. To this mixture were added 0.1 part of *Rhizopus oligosporus* enzyme, and then, two types of lactic acid bacteria, namely, *Lactobacillus bulgaricus* and *Streptococcus thermophilus*, and the mixture was incubated. The mixture exhibited a pH of 4.1 after 24 hours. After the completion of the fermentation, the mixture was neutralized to pH 5.2 with calcium carbonate, sterilized, dried, and used as the product.

Example 6

Bread was baked in a home bread maker according to the following recipe. The resulting bread had a wonderful flavor and it was well received.

| Flour | 400 g |
| --- | --- |
| Water | 312 g |

Composition produced in Example 5 (fermented sesame and

| soy bean) | 12 g |
| --- | --- |
| Butter | 20 g |
| Sugar | 15 g |
| Salt | 4 g |
| Dried yeast | 4 g |

Merits of the Invention

The fermentation product of sesame according to the present invention is a highly digestive food with a good flavor, and this product can be effectively incorporated in various functional foods in view of the antioxidative action of the sesame.

I claim:

1. A fermentation product of sesame seeds having antioxidative properties prepared by digesting powder of raw whole seed sesame with an enzyme derived from *Rhizopus oligosporus*; and subjecting the digestion product to lactic acid fermentation.

2. A dietary food comprising granules of the fermented sesame of claim 1.

3. A food containing the fermented sesame of claim 1.

4. A cookie containing the fermented sesame of claim 1.

5. A bread containing the fermented sesame of claim 1.

6. A soup containing the fermented sesame of claim 1.

7. A yogurt containing the fermented sesame of claim 1.

8. A food composition containing the fermented sesame of claim 1 and lactic acid-fermented soy bean.

* * * * *